United States Patent [19]

Smith et al.

[11] Patent Number: 5,358,145
[45] Date of Patent: Oct. 25, 1994

[54] DISPENSER FOR DELIVERING MICROINGREDIENTS FROM CARTRIDGES

[75] Inventors: Scott H. Smith; Jason T. Griffith, both of Lynnwood; Fahad A. Rashid; Nima Sthienchoak, both of Seattle; Leslie A. Walter, Redmond; William D. St. John, Seattle, all of Wash.

[73] Assignee: Bio Techniques Laboratories, Inc., Redmond, Wash.

[21] Appl. No.: 49,261

[22] Filed: Apr. 19, 1993

[51] Int. Cl.$^5$ ............................................. B67D 5/52
[52] U.S. Cl. ........................................ 222/137; 222/63; 222/135; 222/145; 222/327
[58] Field of Search ............... 222/63, 137, 145, 162, 222/326, 327, 333, 386, 541, 630, 637, 409, 135; 221/236, 239, 294, 299

[56] References Cited

U.S. PATENT DOCUMENTS

| | | | |
|---|---|---|---|
| 2,835,787 | 5/1958 | Mihalyi | 221/239 X |
| 4,516,696 | 5/1985 | Eknor | 222/333 X |
| 4,823,992 | 4/1989 | Fiorentini | 222/333 |
| 4,986,443 | 1/1991 | Saur et al. | 222/327 X |
| 5,199,598 | 4/1993 | Sampson | 221/299 X |
| 5,199,610 | 4/1993 | Gagliardi | 222/333 X |

*Primary Examiner*—Gregory L. Huson
*Attorney, Agent, or Firm*—Christensen, O'Conner, Johnson & Kindness

[57] ABSTRACT

A microingredient dispenser for delivering a continual supply of feed additives from supply cartridges to animal feed. The dispenser includes a frame, first and second hoppers, first and second dispensing stations, a plunger drive mechanism, first and second ingredient receiver couplings, first and second cartridge retainer mechanisms, and control means for coordinating the movement of bar-coded cartridges and a drive mechanism. The hoppers hold multiple cartridges for feeding into the dispensing stations. The ingredients from the cartridges are delivered from the cartridges at the dispensing stations beneath the hoppers. The ingredients are dispensed from the cartridges as the plunger drive mechanism pushes the plungers within the cartridges. The cartridge at one dispensing station is emptied while the cartridge at the other station is being readied for dispensing when the first is empty. In this manner, a continual flow of ingredient can be maintained. The receiver couplings receive and channel the ingredient delivered through the nose of the cartridges to a carder agent which is later mixed with animal feed.

24 Claims, 6 Drawing Sheets

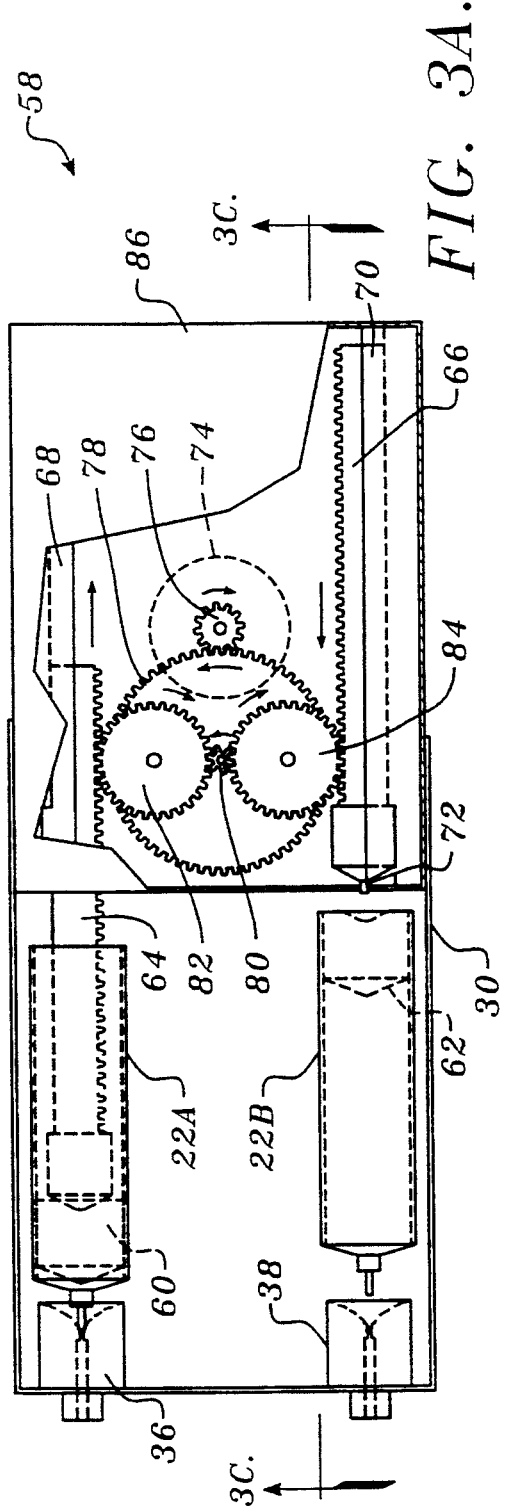
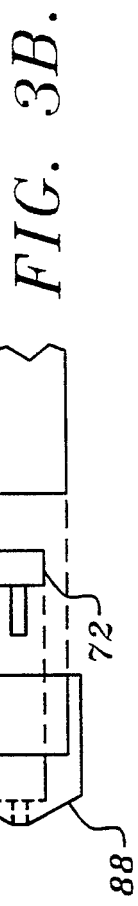
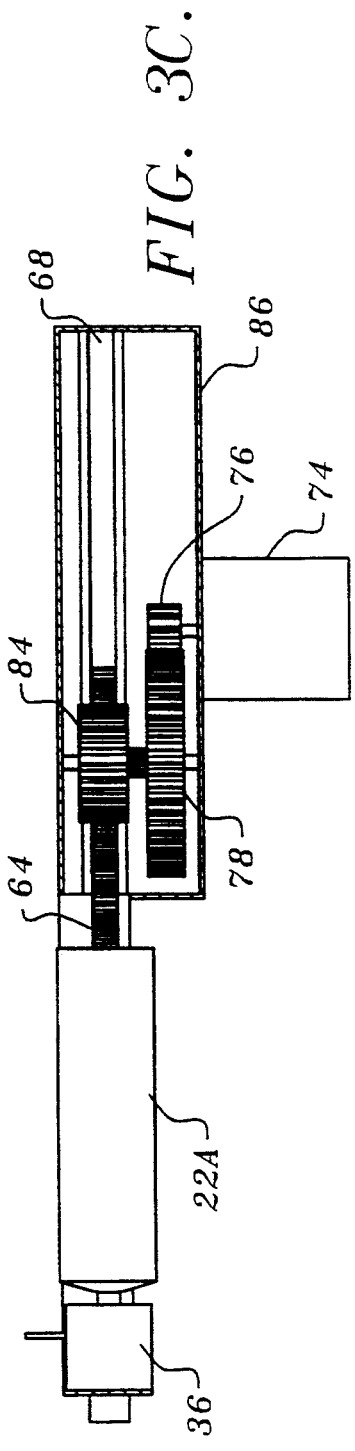
FIG. 3A.
FIG. 3B.
FIG. 3C.

DISPENSER FOR DELIVERING MICROINGREDIENTS FROM CARTRIDGES

FIELD OF THE INVENTION

This invention relates generally to an apparatus and method for dispensing animal feed additives, and more particularly, to a mechanism that provides a preselected continual flow of feed additives, such as microingredients, for supplementing the diets of livestock animals including feed.

BACKGROUND OF THE INVENTION

For years administering feed additive supplements to livestock and other animals has been a common practice. These microingredient supplements have included antibiotics, enzymes, hormones, medications, minerals, proteins, vitamins, direct-fed microbials, and other nutritional supplements and medications that provide a balanced diet, protect the livestock from disease, stimulate growth, and improve feed efficiency. These supplements have been administered in both dry and liquid forms, although the feed industry is shifting more toward feeding liquid supplements and other additives to beef and dairy cattle due to problems encountered with dispensing dry ingredients.

Feed additive premixes have been used in dry form with filler materials to supplement livestock feed. These feed additives were stored in their dry, premixed form at the feedlot until use. These feed-additive premixes were then either mixed with the feed before delivery to the cattle or spread on the feed in the feed bunk. The problems with this manner of administering feed additives include high expense, difficulty in storage, and difficulty in accurate dosing. Uniform mixing with the feed ingredients is almost impossible. One factor causing this difficulty is the tendency for additives of different densities to segregate while in the premix state. This may result in some animals receiving too much of one additive and too little of another. Excess dosages of especially toxic additives can have dangerous effects on the animals. Insufficient dosages may not effectively perform their intended functions.

Another problem contributing to the difficulty in administering accurate dosages is the tendency of feed additives to breakdown physically and/or chemically. Handling and storage of the feed additives over long periods of time and in diverse environmental conditions that may exist at the feedlot adds to this breakdown.

Premixed feed additives also limit the choices of additive combinations that livestock can be fed to those combinations commercially available. They also limit the flexibility to feed different groups of animals different combinations and dosages of microingredients to meet their differing needs.

Attempts have been made at solving the foregoing problems. For example, various methods and apparatus have been developed that dispense feed additive concentrates into a fluid stream at the feedlot (see U.S. Pat. Nos. 4,733,971; 4,910,024; 5,008,821; 3,822,056; 3,720,185; 3,498,311; 3,670,923; 3,806,001; 3,437,075; 4,889,433; and 4,815,042). In many of these attempts, feed additive concentrates are stored in vats and separately delivered either by weight or by volume to a liquid carrier, such as water, for dilution, dispersion, and suspension. The resulting fluid is then delivered into livestock drinking water or feed before consumption.

Although these methods may have helped overcome some of the problems inherent in dry-mix additives, they still do not adequately and efficiently meet the high standards required for administration of many microingredient feed additives. For example, live microorganisms used as feed additives. These direct-fed microbials added to cattle feed can increase nutrient absorption efficiency and help control the proliferation of harmful microorganisms in digestive tracts of animals that could adversely affect weight gain or milk production.

One example of a currently used microingredient feed additive that illustrates some of the problems involved in administering liquid feed additives is a formulation developed by the owner of the present application called Cobactin ®. The microbial feed additive, Cobactin ®, contains the bacteria, *Lactobacillus acidophilus*, that works in the digestive tract of beef cattle. Data from cattle feeding trials indicate that Cobactin ® increases the carcass weight of the cattle by an average of three to five percent. Cobactin ® is preferably delivered to the cattle along with other feed supplements and feed ingredients.

Maintaining the viability of these bacteria at the feedlot is difficult since they are sensitive to environmental influences such as moisture, air, temperature extremes, and many chemicals. The bacteria may be appropriately packaged to greatly extend shelf life. However, the delivery of the bacteria may cause the bacteria to become labile. The appropriate dosage of the bacteria must be delivered to the feed truck according to the weight of the feed ingredient placed in the truck while maintaining the viability of Cobactin ®. The application of Cobactin ® must also be carefully controlled to prevent contamination.

The inherent nature of the prior devices and methods used limits their ability to reliably meet these high standards. The use of the prior methods can also be complicated in administering the feed. The systems involve so many separate pieces of equipment to deliver, mix, store, cool, and disperse the microingredients that maintenance and cleaning would be quite costly. The complication also leads to lower reliability and higher manufacturing costs and significant service costs. These high costs limit these machines to only the largest operations. They simply are not cost effective. The mixing vats and associated machines make prevention of contamination difficult at best.

Therefore, there exists a need for a microingredient additive delivery system and method that is easy to use, inexpensive to manufacture and maintain, reliable to accurately deliver small dosages without significant interruption, useful with a wide variety of animals and sizes of livestock rearing or dairy operations, and resistant to contamination. Accordingly, the present invention was developed and provides significant advantages over previous devices or methods used to deliver microingredient feed additives.

SUMMARY OF THE INVENTION

In accordance with this invention, an apparatus for delivering a continual supply of ingredients from cartridges each having a plunger, a forward end, and a rearward end is disclosed. The apparatus includes at least one module to dispense a microingredient. Each module includes a frame, a first hopper, a first dispensing station, and a plunger drive mechanism. The frame has a forward side and a rearward side. The first hopper is attached to the frame and holds at least one cartridge.

The first dispensing station is disposed adjacent the first hopper and holds a cartridge during delivery of an ingredient from the cartridge. The plunger drive mechanism is attached to the frame at the rearward side thereof. This mechanism advances a plunger within a cartridge to thereby dispense an ingredient.

The preferred embodiment of this invention also includes a second hopper and a second dispensing station. The second hopper is attached to the frame and holds at least one cartridge. The second dispensing station is disposed adjacent the second hopper. It holds a cartridge during delivery of an ingredient from the cartridge. The plunger drive mechanism is arranged and configured to drive the plungers such that a cartridge in the first dispensing station delivers an ingredient while a cartridge is being readied for dispensing an ingredient from the second dispensing station.

In accordance with the preferred embodiment of this invention, the plunger drive mechanism includes a first rod, a second rod, and a rod drive means. The first rod is slidably coupled to the frame and disposed along a longitudinal axis of a cartridge at the first dispensing station at a rearward end of said cartridge. The second rod is also slidably coupled to the frame. It is disposed along a longitudinal axis of a cartridge at the second dispensing station at a rearward end of the cartridge. The rod drive means operates to move the first rod and the second rod longitudinally along the longitudinal axes. Preferably, this rod drive means is arranged and configured to cause the first rod and the second rod to move in opposite directions.

In accordance with a further preferred aspect, the plunger drive mechanism further includes a means for indicating contact of the first rod and the second rod with plungers of cartridges at the first dispensing station and the second dispensing station, respectively.

In accordance with another preferred aspect of this invention, each module also includes first and second cartridge retainer mechanisms attached to the frame to controllably advance cartridges into and out of the first and second dispensing stations, respectively. These cartridge retainer mechanisms preferably comprise paddlewheels.

The invention preferably also includes a control means for controlling movement of the cartridges through the module and controlling the dispensing of the microingredients from the individual dispensing stations.

Another preferred aspect of this invention includes ingredient receiver couplings at each module. These couplings are attached to the frame and receive the forward end of the cartridges, from which an ingredient is delivered. The couplings form a seal with the nose of the cartridges to receive the flow of the ingredient when delivered. Preferably, each of these ingredient receiver couplings includes a nose guide portion, a flexible seal, and an ingredient channel. The nose guide portion is disposed at the rearward end of the ingredient receiver coupling. It has an inward slope to direct the nose portion as it moves into engagement with the ingredient receiver coupling. The flexible seal preferably comprises an O-ring and is disposed adjacent to the nose guide portion to seal the connection between the nose portion and the ingredient receiver coupling. The ingredient channel extends through the ingredient receiver coupling. It directs the flow of an ingredient as it is received from the cartridge.

Another preferred aspect of the ingredient receiver is an inlet channel. This channel extends from outside the ingredient receiver coupling to a rearward portion of the ingredient channel.

In accordance with another preferred aspect of this invention the cartridges further include bar coding, the module of the apparatus further comprising a bar code reader coupled to the frame.

This invention is also directed to a method for dispensing a microingredient feed additive. The steps of the method are generally consistent with the function provided by the elements of the apparatus discussed above.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3A is a top view showing the plunger drive mechanism of the present invention interacting with two cartridges;

FIG. 3B is an exploded view of the end of a rack showing the rack switch;

FIG. 3C is a side view taken through a portion of the plunger drive mechanism shown in FIG. 3 A;

DETAILED DESCRIPTION OF THE PREFERRED EMBODIMENT

Figure 1:
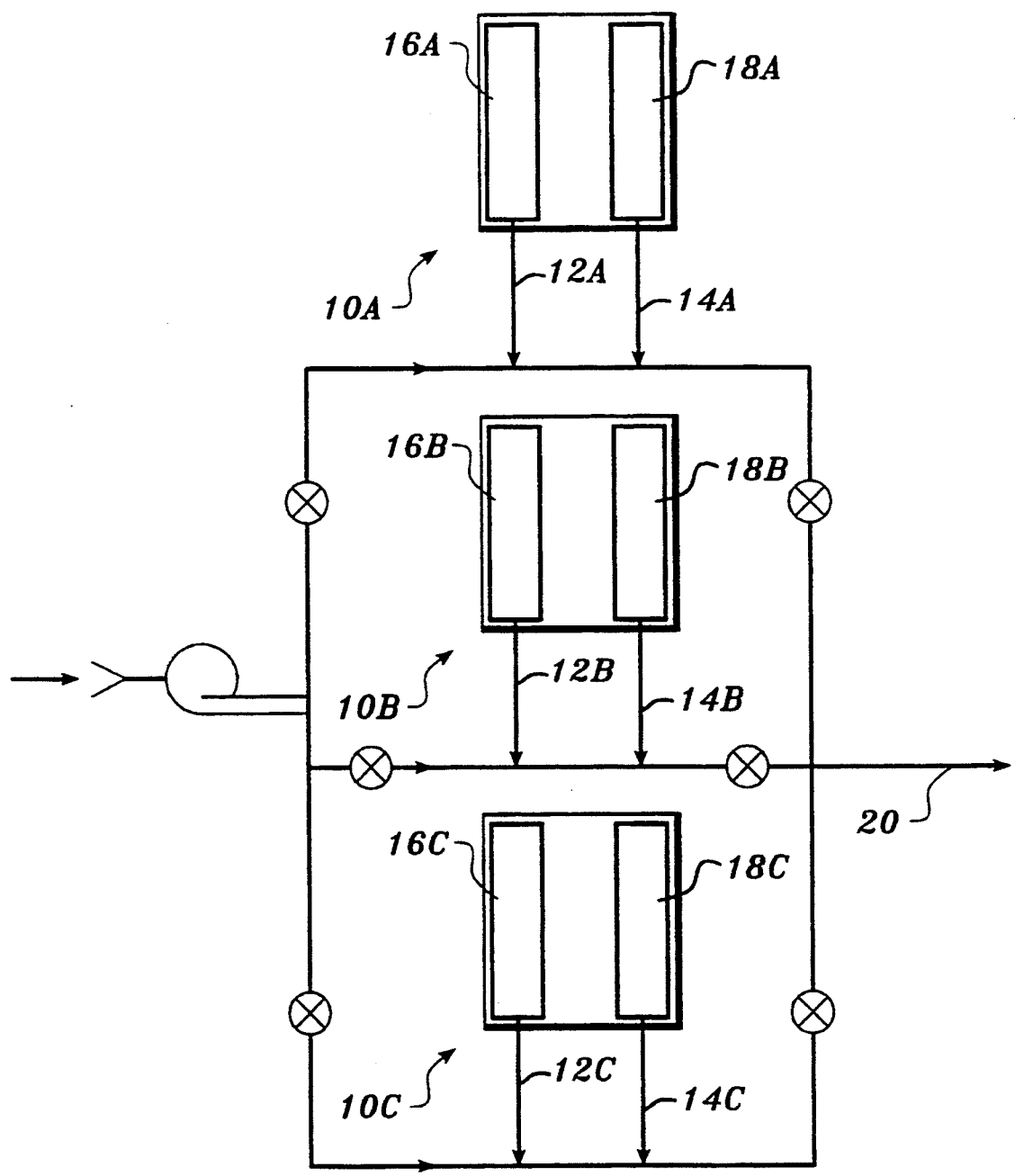
FIG. 1 is a schematic diagram illustrating the basic flow of the microingredient dispenser with three modules shown.

Referring to FIG. 1, the present invention is an apparatus and method to dispense microingredients from modules 10. Three modules 10a, 10b, 10c are illustrated in FIG. 1, indicating that different microingredients may be dispensed simultaneously from separate modules 10 to the animal feed. Additives or microingredients from each module 10 exit through a first delivery stream 12 and a second delivery stream 14. First delivery stream 12 flows from a first dispensing station 16, while second delivery stream 14 flows from a second dispensing station 18. Both streams are channeled to carrier stream 20 which typically would be a fluid carrier, such as water, flowing to a truck to be mixed with or sprayed on the animal feed. Alternatively, the fluid flows directly to the feed bunks or drinking reservoirs of the animals. Typically, the same microingredient would be dispensed from first and second dispensing stations 16, 18 at each module 10. One of dispensing stations 16a, 18a operates at one time such that, for example, first dispensing station 16a would release its microingredient through first delivery stream 12a while second dispensing station 18a is preparing to deliver the same microingredient after the ingredient at first dispensing station 16a is spent. Likewise, while second dispensing station 18a is delivering microingredient through second delivery stream 14a to carrier stream 20, first dispensing station 16a is again preparing to deliver the microingredient. In this manner, the microingredient can have a continual flow into carrier stream 20 with only small time lapses when cartridges 22 in FIG. 2 are changed.

The same process may be carried out in any number of modules 10 such that any number of microingredients can be dispensed into animal feed or water depending on the characteristics of the particular group of animals being fed and the desired nutrients or medications and dosages desired. For example, Cobactin ® may be dispensed from module 10a while a vitamin supplement may be dispensed from 10b and a medical ingredient dispensed from 10c all simultaneously and all having a continual flow into carrier stream 20.

Figure 2:
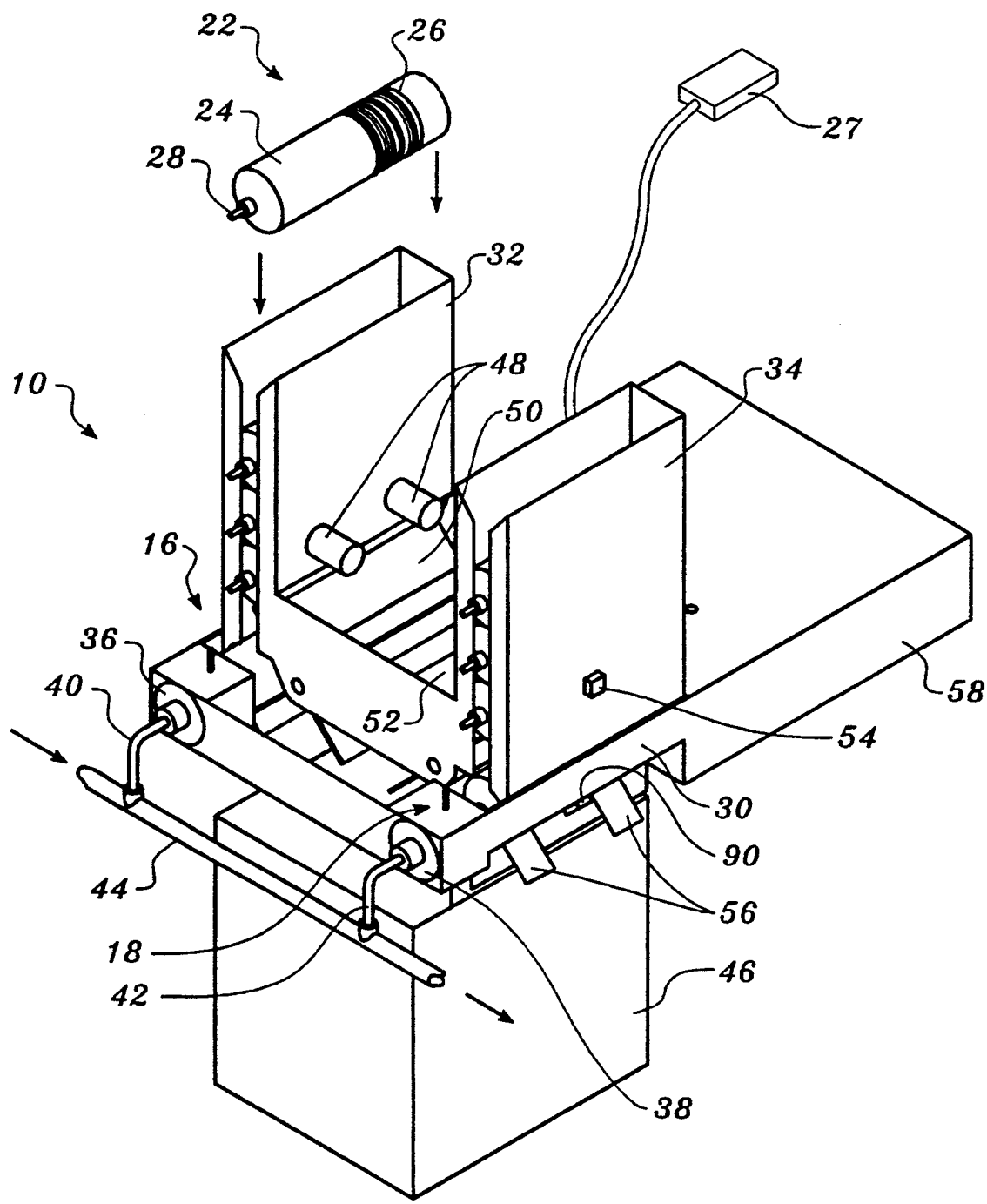
FIG. 2 is an isometric view of one module of the present invention.

Referring to FIG. 2, a typical module 10 is shown. The microingredient to be dispensed is contained and stored within a cartridge 22. Cartridge 22 includes a cylinder 24 on which a bar code 26 is preferably inscribed. Cartridge 22 also includes a nose 28 at its forward end. Cartridge 22 may be sealed with the microingredient inside so as to preserve the viability and/or prevent contamination to the ingredient inside. For example, cartridge 22 may contain Cobactin ®. The containment of Cobactin ® in cartridge 22 protects it from contamination and other environmental effects. Bar code 26 is useful to track the ingredients which are dispensed from module 10. Bar code 26 may include data regarding the type of microingredient contained within cartridge 22, the concentration of the ingredient, and the expiration and/or fill date of the ingredient placed within cartridge 22. It also provides a means for tracking cartridge 22 and its microingredient as it is dispensed. Bar code 26 extends circumferentially around cylinder 24 of cartridge 22 such that it may be easily read by a bar code reader 27 coupled to module 10. The bar code reader then feeds the data directly to a central processing unit (not shown) to automatically track the microingredients. The bar coding system is also used to protect against the accidental mix-up of microingredients, rejecting tubes with the wrong code. The central processing unit or computer also has fluid stream 20 flow and temperature inputs so that proper precautions and checks can be made depending on the characteristics of the additive to be dispensed.

Several cartridges 22 may be loaded into module 10. Module 10 includes a first hopper 32 and a second hopper 34 for this purpose. These hoppers 32, 34 are connected to frame 30. Only a portion of frame 30 is illustrated in FIG. 2, but it should be understood that frame 30 is simply a support structure for module 10. First hopper 32 is situated on the right side of module 10. It has a vertical orientation. Second hopper 34 is simply a mirror image of first hopper 32. Second hopper 34 is located on the left side of module 10. The hoppers have walls extending vertically which contain cartridges 22 with their longitudinal axis oriented horizontally. Hoppers 32, 34 have rectangular openings which are designed to be only slightly larger than cartridges 22 that are loaded therein. The vertical height of hoppers 32, 34 is sufficient to hold at least three or four cartridges each. In an alternate embodiment, both hoppers are fed from a larger hopper situated above hoppers 32, 34 that feeds into hoppers 32, 34. The arrangement of the hoppers depends on the number of cartridges 22 desired to be stored therein. In the preferred embodiment illustrated in FIG. 2, four cartridges 22 may be stored within each of hoppers 32, 34. Typically, the microingredients contained within each of cartridges 22 are concentrated to the point where they combine with a large amount of animal feed ration such that one of cartridges 22 would supply enough microingredient to mix with 40 to 100 tons of feed.

First hopper 32 is positioned directly above first dispensing station 16. Second hopper 34 is positioned above second dispensing station 18. This allows hoppers 32, 34 to feed cartridges 22 to first and second dispensing stations 16, 18. In the preferred embodiment of module 10, first and second hoppers 32, 34 are separately removable for ease of maintenance, replacement, and interchangeability.

First and second dispensing stations 16, 18 hold cartridges 22 in a horizontal orientation while the microingredients contained therein are dispensed, one dispensing station at a time. The microingredient within the cartridge at the dispensing station 16, which is delivering a microingredient, has its forward end within first receiver coupling 36. First receiver coupling 36 receives nose 28 at the forward end of cartridge 22. First receiver coupling 36 makes a seal with nose 28 and directs the flow of the microingredient. A second receiver coupling 38 on the left side of module 10 is positioned at the forward end of second dispensing station 18. Like first receiver coupling 36, second receiver coupling 38 receives nose 28 of one of cartridges 22 at second dispensing station 18. More specifics of receiver couplings 36, 38 will be discussed below.

A first delivery pipe 40 at its rearward end is coupled to first receiver coupling 36. A second delivery pipe 42 at its rearward end is coupled to second receiver coupling 38. Both delivery pipes 40, 42 are coupled at their forward ends to a fluid pipe 44 which holds carder stream 20 traveling to the animal feed. In the preferred embodiment, first and second delivery pipes 40, 42 each individually connect to fluid pipe 44 from first and second receiver couplings 36, 38, respectively. Alternatively, however, first and second delivery pipes 40, 42 are coupled together so that their flows intersect before entering fluid pipe 44.

After one of cartridges 22 is spent in either first dispensing station 16 or second dispensing station 18, it is dropped into a catch bin 46. Catch bin 46 is positioned beneath first and second dispensing stations 16, 18 so as to conveniently catch and contain empty cartridges 22. Cartridges 22 may then be carried away in catch bin 46 for recharging, recycling, or disposal.

Cartridges are held from freely feeding through hoppers 32, 34, dispensing stations 16, 18, and into catch bin 46 by several different mechanisms. Cartridge retention solenoids 48 are attached along the inside walls of hoppers 32, 34. They are controlled to hold all but bottom cartridge 22 within hoppers 32, 34. Cartridge retention solenoids 48 allow a cartridge to advance to a position ready to be brought into one of dispensing stations 16, 18. A first paddlewheel 50 is positioned below and to the left side of first hopper 32. It has four paddles which project radially outward from a central core that is rotatably connected to frame 30 at the ends of the core. It is positioned and oriented such that it has a longitudinal axis which runs parallel to the longitudinal axes of cartridges 22. The longitudinal axis of paddlewheel 50 is positioned just to the left of first hopper 32 and first dispensing station 16 such that two of its paddles project into the path of cartridges 22.

One paddle holds cartridge 22 above first dispensing station 16 while the next paddle retains cartridge 22 that is positioned at first dispensing station 16 and prevents it from falling into catch bin 46. A second paddlewheel 52 is positioned just to the right of second hopper 34 and second dispensing station 18 between the tube. Its operation is identical to that of first paddlewheel 50. Position indicating microswitches 54 are attached to the outside walls of first hopper 32 and second hopper 34. They indicate that cartridges are in hoppers 32, 34, ready to be positioned at first and second dispensing stations 16, 18. Finally, paddlewheel retention solenoids 56 are positioned to hold paddlewheels 50, 52 from simply free-wheeling Further details of a progression of cartridges 22 through module 10 with paddlewheels 50, 52 will be discussed below in connection with FIGS. 4 and 5.

A plunger drive mechanism 58 is positioned at the rearward end of first and second dispensing stations 16, 18. Plunger drive mechanism 58 provides a means to force the microingredients contained within cartridges 22 at dispensing stations 16, 18 into receiver couplings 36, 38 and subsequently to fluid pipe 44. Plunger drive mechanism 58 is also supported by frame 30.

FIGS. 3A, 3B, and 3C illustrate the details of plunger drive mechanism 58. Cartridges 22a, 22b include first and second plungers 60, 62 disposed within cylinders 24. Cartridge 22b is shown with second plunger 62 in a rearward position, cartridge 22b being full of a microingredient. Cartridge 22a is shown with first plunger 60 in a forward position after most of the microingredient from cartridge 22a has been dispensed through first receiver coupling 36.

A first rack 64 is used to push first plunger 60 within cartridge 22a. Similarly, a second rack 66 is used to push second plunger 62 within cartridge 22b. First rack 64 is in the form of a square rod with teeth on its inwardly facing surface. It has a longitudinal axis which is aligned with the longitudinal axis of cartridge 22a, such that movement of first rack 64 in a forward or rearward direction is into or out of cylinder 24 of cartridge 22a without contacting the walls of cartridge 22a. First rack 64 is slidably coupled to frame 30 through first channel 68. First channel 68 guides first rack 64 with surfaces contacting all but the inwardly facing side of first rack 64. The inwardly facing side has teeth that interface with the rest of plunger drive mechanism 58 as described below, to cause first rack 64 to move in either a forward or rearward direction. Likewise, second rack 66 is slidably coupled to frame 30 through a second channel 70 which mirrors first channel 68 on the left side of plunger drive mechanism 58.

As first rack 64 is moved in a forward direction, it contacts first plunger 60. Initially, the force exerted by first rack 64 against first plunger 60 causes the entire cartridge 22 to move within first dispensing station 16 in a forward direction until its movement is stopped by first receiver coupling 36. Nose 28 of cartridge 22a contacts first receiver coupling 36 and forms a seal therewith. First receiver coupling 36 also acts to restrain further forward movement of cartridge 22a such that further forward movement of first rack 64 causes first plunger 60 to advance within cylinder 24 of cartridge 22a. This forward movement of first plunger 60 dispenses the microingredient contained within cartridge 22a through first receiver coupling 36. First rack 64 moves in response to computer signals. The movement can therefore be recorded to accurately monitor doses dispensed.

Once first plunger 60 reaches the forward end of cartridge 22a, first rack 64 is moved in a rearward direction to remove first rack 64 from within cartridge 22a so that cartridge 22a may be dropped from first dispensing station 16 and a new cartridge may be readied for placement therein. Simultaneously with the rearward movement of first rack 64, second rack 66 moves in a forward direction to dispense the microingredient contained within cartridge 22b at second dispensing station 18.

The cycle thus continues with second plunger 62 being forced in a forward direction, forcing cartridge 22b into contact with second receiver coupling 38. The microingredient within cartridge 22b is dispensed similar to as was done with cartridge 22a. Once dispensed, second rack 66 moves in a rearward direction while first rack 64 then moves in a forward direction to dispense more microingredient from another of cartridges 22 now within first dispensing station 16. In this manner, microingredient from module 10 can be continually supplied to a carrier stream with one dispensing station delivering microingredient, while the other dispensing station is preparing for cartridge changeover. There is only a small time lapse during cartridge changeover.

Rack switches 72 are coupled to the forward ends of first and second racks 64, 66. Rack switches 72 indicate when contact has been made with first and second plungers 60, 62.

Plunger drive mechanism 58 also includes a motor 74 and gears that engage and drive first and second racks 64, 66 in forward and rearward directions. Motor 74 is connected between and beneath first and second racks 64, 66 at the rearward side of module 10. The drive shaft of motor 74 has a vertical orientation perpendicular to the longitudinal axis of first and second racks 64, 66. A first gear 76 is attached to the drive shaft of motor 74. First gear 76 engages a much larger second gear 78. Second gear 78 is positioned just forward of first gear 76. Second gear 78 is connected through a shaft to third gear 80 at its center. Third gear 80 is positioned directly above second gear 78 and is much smaller than second gear 78. Because of the arrangement of second gear 78 being much larger than first gear 76, while third gear 80 is much smaller than second gear 78, a reduction in the angular velocity of third gear 80 relative to first gear 76 is achieved. Third gear 80 is engaged to both a fourth gear 82 and a fifth gear 84. Fourth gear 82 is positioned on the right side of third gear 80 and is engaged between third gear 80 and first rack 64. Fifth gear 84 is engaged between third gear 80 and second rack 66. Rotation of third gear 80 in a counterclockwise direction rotates both fourth and fifth gears 82, 84 in clockwise directions. Because first rack 64 is positioned on the right side of fourth gear 82 and second rack 66 is positioned on the left side of fifth gear 84, racks 64, 66 move in opposite directions in response to the rotation of the gears in the same direction. Also, because fourth and fifth gears 82, 84 have equal diameters that are larger than third gear 80, further speed reduction takes place. This speed reduction allows the motion of first and second racks 64, 66 to be quite slow, if desired, to slowly and accurately dispense a microingredient.

In the preferred embodiment, motor 74 is a stepper motor with a torque sensor to reverse direction in response to excessive resistance, such that larger amperages are created within the motor. Excessive resistance occurs when one of plungers 60, 62 stops at the forward end of one of cartridges 22 and causes resistance to be transmitted through one of racks 64, 66 and the gear train to motor 74. If excessive resistance occurs before one of the plungers 60, 62 has reached the forward end of one of the cartridges 22 the computer will signal an error.

Due to this gear train setup, plunger drive mechanism 58 always drives first rack 64 in a direction opposite to the movement of second rack 66 at equal velocity. In this manner, an ingredient being dispensed from cartridge 22a corresponds to second rack 66 being removed from cartridge 22b such that the fresh cartridge can be inserted in place thereof. Then, when first rack 64 begins its rearward motion, second rack 66 begins forward motion to dispense the microingredient from the cartridge at second dispensing station 18. This provides a continual flow of microingredient.

FIG. 3A also illustrates that receiver couplings 36, 38 are structurally secured via frame 30 to gear housing 86. This arrangement causes the force transmitted from plunger drive mechanism 58 through racks 64, 66 and cartridges 22 to be opposed by receiver couplings 36, 38. This results in more accurate delivery and structural integrity.

The details of rack switch 72 are illustrated in FIG. 3B. Racks 64, 66 each receive, at their forward ends, rack switches 72 and sleeves 88. Sleeves 88 are cylindrical with an inner diameter that may be force-fit over the forward ends of racks 64, 66. Sleeves 88 fit over rack switches 72 to hold rack switches 72 in place. Forward projections of rack switches 72 project through the forward ends of sleeves 88 so that they will come into contact with the guide recesses in plungers 60, 62, to indicate that contact has been made. The forward ends of sleeves 88 are reduced to a conical shape to angle toward the projecting rack switches 72.

FIG. 3C is a side view of plunger drive mechanism 58, cartridge 22a, and receiver coupling 36. Motor 74 is shown connected to a gear housing 86 that is attached to frame 30 (not shown). First channel 68 is positioned along the right side of gear housing 86 to slidably hold first rack 64. Gear housing 86 also provides a surface through which the central axles of the gears in the plunger drive mechanism 58 can be attached.

Figure 4:
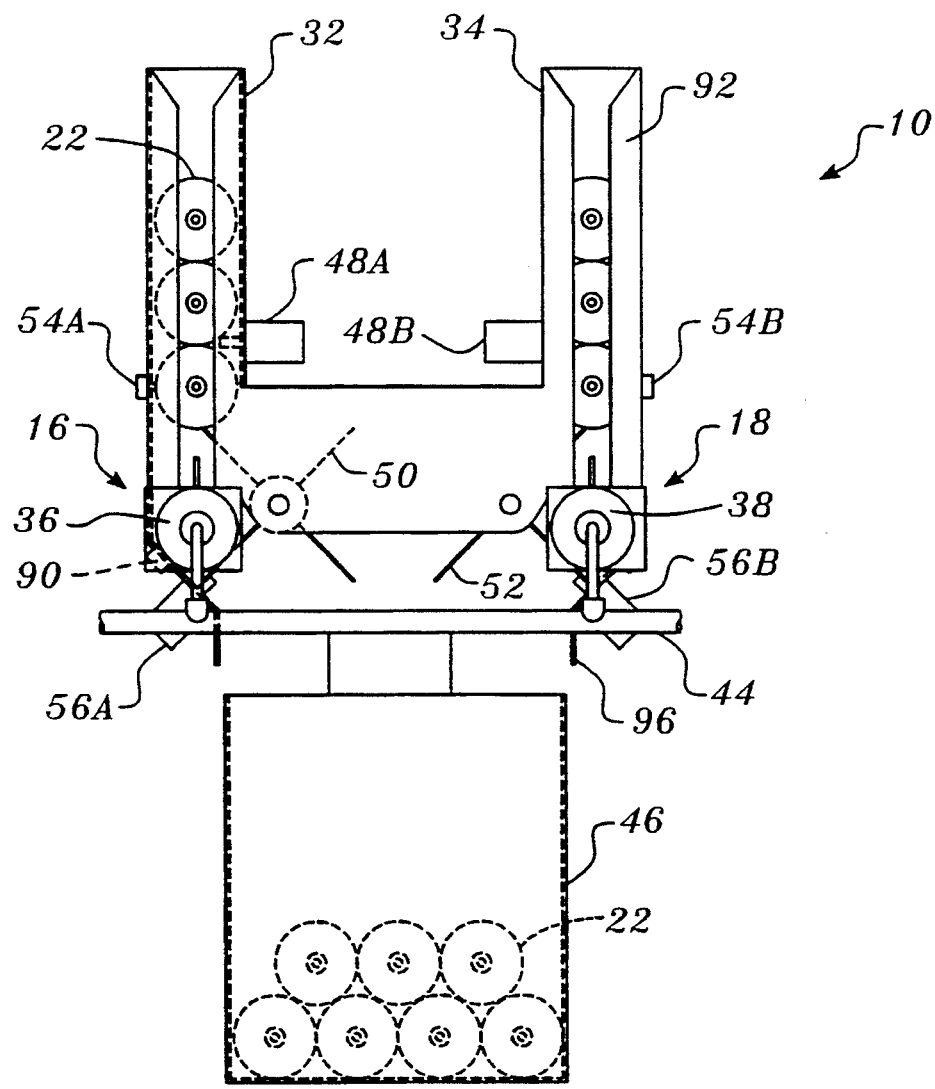
FIG. 4 is a front view of one module of the present invention illustrating the progression of the cartridges through the module.
Figure 5:
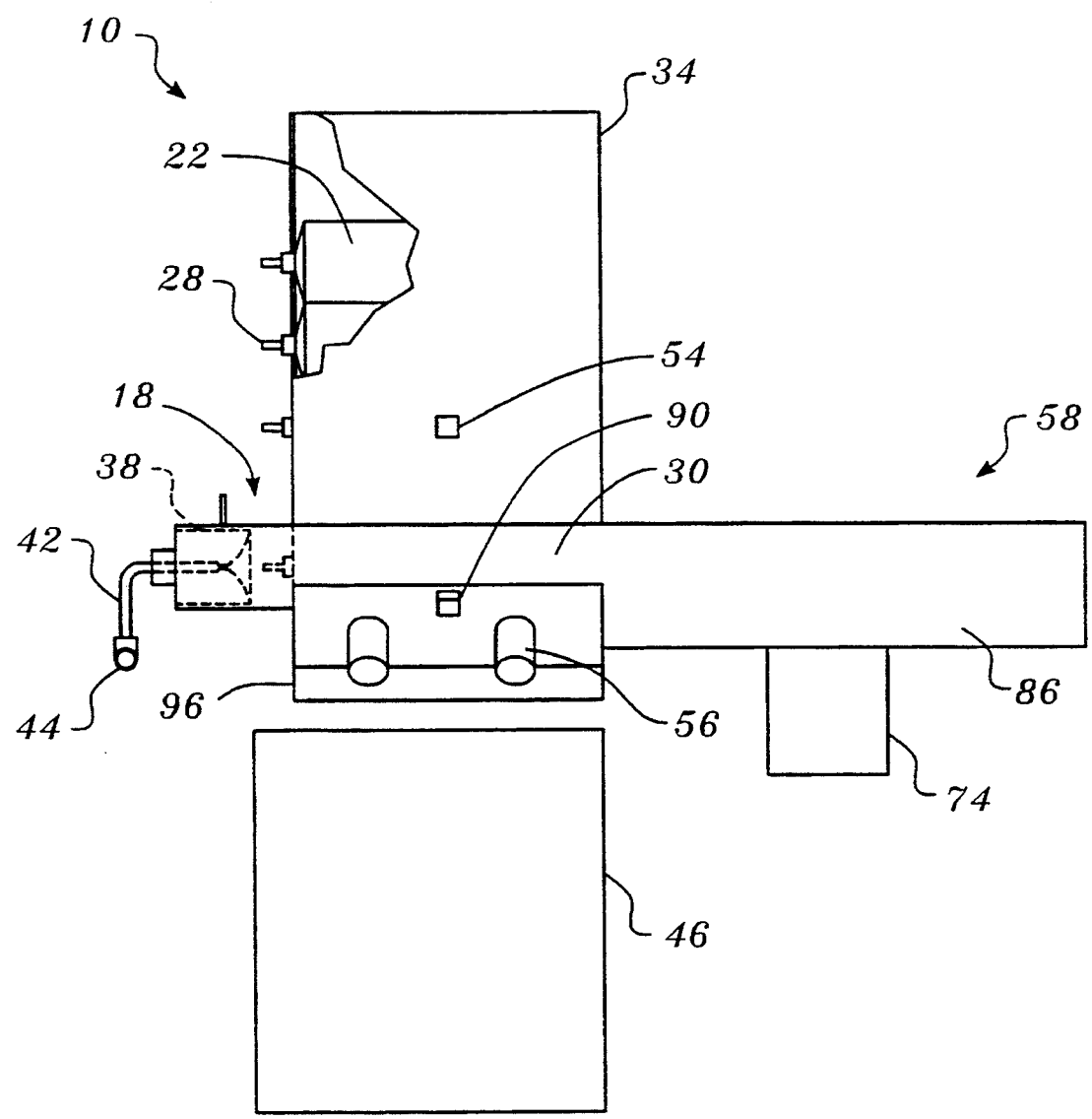
FIG. 5 is a side view of one module of the invention.

FIGS. 4 and 5 illustrate the general progression of cartridges 22 through module 10. Cartridges 22 are first loaded into first and second hoppers 32, 34. The first of cartridges 22 loaded into first hopper 32 is positioned at first dispensing station 16 behind first receiver coupling 36. Dispensing station microswitches 90 are attached to hoppers 32, 34 and project within dispensing stations 16, 18 to indicate when one of cartridges 22 is positioned within one or both of dispensing stations 16, 18.

Loading of cartridge 22 at first dispensing station 16 is possible with first rack 64 in a rearward position. With first rack 64 in a rearward position, second rack 66 would be in a forward position (see FIG. 3A). Therefore, the first of cartridges 22 that is loaded into second hopper 34 is not allowed to drop within second dispensing station 18. The first of cartridges 22 loaded into second hopper 34 is held above second dispensing station 18 by one of the four paddles of second paddlewheel 52. Likewise, the second of cartridges 22 loaded into first hopper 32 is held above first dispensing station 16 by one of the four paddles of first paddlewheel 50. The first of cartridges 22 placed within first hopper 32 and allowed to be positioned at first dispensing station 16 is held from dropping into catch bin 46 by another of the paddles of first paddlewheel 50. Paddlewheel 50 as well as second paddlewheel 52 are held from turning by paddlewheel retention solenoids 56 disposed between first and second dispensing stations 16, 18. The rods of paddlewheel retention solenoids 56 project toward the cores of their associated paddlewheels 50, 52. Paddlewheel retention solenoids 56 selectively retract their rods to allow paddlewheels 50, 52 to rotate. The first paddlewheel 50 would rotate in a counterclockwise direction as cartridges 22 loaded within first hopper 32 push on its paddles on the right side of the core of first paddlewheel 50. Second paddlewheel 52 rotates in a clockwise direction since the cartridges loaded thereon are disposed on the left side of its core.

First and second hoppers 32, 34 have forward walls 92 projecting inwardly from the sides of first and second hoppers 32, 34 in a direction perpendicular to the longitudinal axes of loaded cartridges 22. However, forward walls 92 do not project completely across the forward face of first and second hoppers 32, 34. A vertical slot is created through which noses 28 project. In this manner, forward walls 92 which create the slot help guide cartridges 22 correctly. They do not allow a cartridge 22 to be loaded in a reverse direction since a similar gap is not created at the rearward end of first and second hoppers 32, 34.

Cartridge retention solenoids 48 retain all but one cartridge within each of hoppers 32, 34 from resting on first and second paddlewheels 50, 52. Therefore, when a paddlewheel is allowed to advance by the retraction of the rod of one set of paddlewheel retention solenoids 56, only one additional cartridge will be loaded into one of the dispensing stations 16, 18. To provide a fresh cartridge at first dispensing station 16, for example, the right-side paddlewheel retention solenoids 56 retract their rods and allow first paddlewheel 50 to rotate. Cartridge 22 that is at first dispensing station 16 simply drops into catch bin 46. A fresh cartridge 22 is then allowed to drop into position at first dispensing station 16, the right-side paddlewheel retention solenoids 56 having extended their rods so as to retain first paddlewheel 50 from further rotation. At this point, right-side cartridge retention solenoids 48 retract their rods to allow another of cartridges 22 to be positioned above first paddlewheel 50. Position-indicating microswitches 54 detect the presence of a properly positioned cartridge 22 ready to drop into dispensing stations 16, 18. First and second paddlewheels 50, 52, are allowed to rotate freely, each in only one direction, if not retained by paddlewheel retention solenoids 56. First paddlewheel 50 rotates freely in a counterclockwise direction, while second paddlewheel 52 rotates freely in a clockwise direction. Manually releasable ratchet couplings are mounted to the paddlewheel cores to insure the desired direction of rotation.

Once a cartridge is allowed to be dropped from one of first and second dispensing stations 16, 18, drop guides 96 direct the cartridge into catch bin 46. Drop guides 96 are simply extensions of the side of frame 30 of module 10 that angle inwardly and then vertically in a downward direction to guide ejected cartridges 22 into catch bin 46.

The normal movement of cartridges 22 through module 10 can be summarized as follows:
1) one of cartridges 22 located at first dispensing station 16 is dispensed by first rack 64 pushing first plunger 60 through cartridge 22;

2) second rack 66 is simultaneously moved in a rearward direction until the torque sensor on motor 74 senses the resistance from first rack 64 at the end of cartridge 22 at first dispensing station 16;

3) cartridge 22 that is held at second dispensing station 18 is allowed to drop into catch bin 46 by a pulsed retraction of left-side paddle wheel retention solenoid 56b;

4) the rotation of second paddlewheel 52 in a clockwise direction stops when the next paddle contacts the same retention solenoid 56b, moving another of cartridges 22 into position at second dispensing station 18, its position there being sensed by dispensing station microswitch 90;

5) with second paddlewheel 52 retained, left-side cartridge retention solenoid 48b retracts long enough for another of cartridges 22 to come to rest on the upper, outside paddle of second paddlewheel 52, the successful positioning of the cartridge being sensed by left-side position-indicating microswitch 54b;

6) the speed of stepper motor 74 is increased from the dispensing rate to reduce the time lag in dispensing ingredients until second rack 66 comes into contact with second plunger 62 as indicated by left-side rack switch 72;

7) motor 74 continues to forwardly advance second rack 66, although at a slower predetermined pace, while simultaneously moving first rack 64 in a rearward direction;

8) when second rack 66 pushes second plunger 62 cartridge 22 located at second dispensing station 18 is moved into contact with second receiver coupling 38;

9) second receiver coupling 38 inhibits further forward movement of cartridge 22 so that as second rack 66 continues to advance second plunger 62 forces the ingredient from within cartridge 22 through second receiver coupling 38; and 10) this cycle continues with one side dispensing the ingredient then the other until a predetermined time or a desired amount of an ingredient has been dispensed.

When an operator desires to empty all cartridges paddlewheel retention solenoids 56 on one side of module 10 pulse to allow one of cartridges 22 to drop after which cartridge retention solenoids 48 pulse to advance another cartridge to the paddlewheel. This cycle of alternating pulses of solenoids 48, 56 continues until all cartridges 22 from one side of module 10 have exited. Racks 64, 66 then move so the other side may be emptied in the same manner.

Figure 6A:
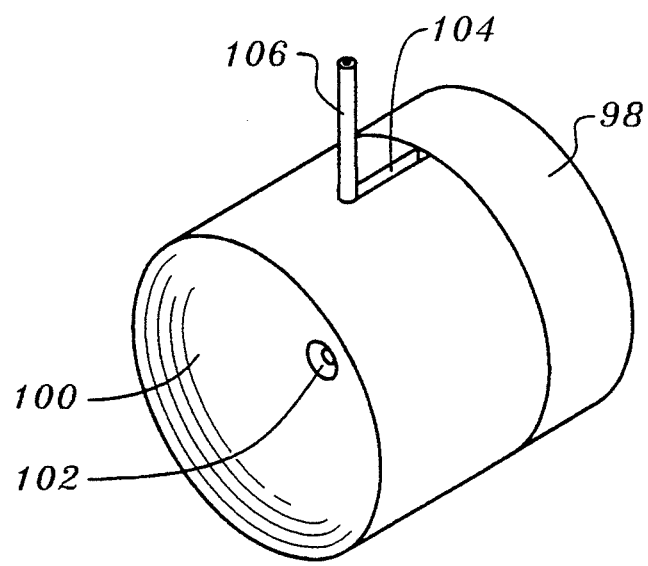
FIG. 6A is an isometric view of the receiver coupling.
Figure 6B:
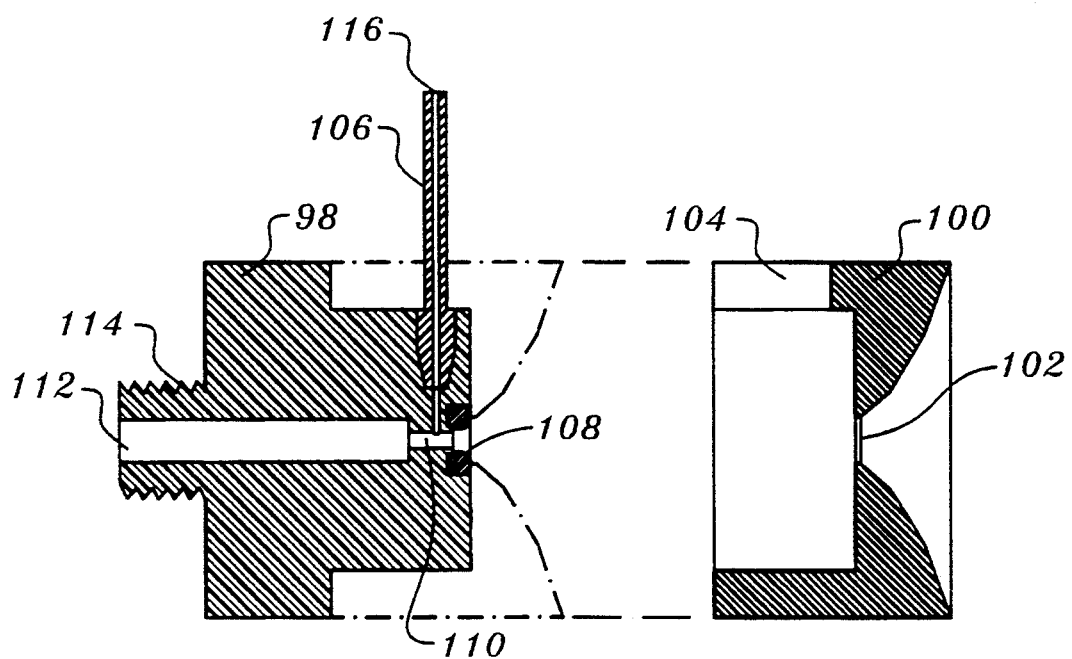
FIG. 6B is a cross-sectional view cut with a vertical plane along the longitudinal axis of the receiver coupling shown in FIG. 6A.

An example of the operative portions of first and second receiver couplings 36, 38 is illustrated in FIGS. 6a and 6b. Receiver couplings 36, 38 each include a body 98 and a nose guide 100 that fits partially over body 98. The entire assembly is essentially cylindrical in shape. Nose guide 100 is coupled to the forward end of body 98. The forward face of nose guide 100 slopes inwardly and rearwardly and forms a nose opening at its center. The slope of nose guide 100 inwardly increases towards central opening 102. Nose guide 100 also includes a cutaway 104 to allow passage of an air inlet tube 106 which is attached to body 98. Cutaway 104 is in a generally U-shape preceding from the rearward top side of nose guide 100 about halfway toward the forward end of nose guide 100. The forward end of body 98 has a smaller diameter to allow nose guide 100 to be fitted over body 98.

The center of the forward face of body 98 has a cutaway section configured to receive an O-ring 108 therein. The cutaway section has a circular shape with an inner ridge. O-ring 108 fits snugly within this area so that when noseguide 100 is placed over body 98, O-ring 108 remains securely in place. A constricted channel 110 extends from the inside of the inner ridge and O-ring 108 rearwardly to a larger output channel 112. Output channel 112 has a larger diameter and extends from constricted channel 110 entirely through body 98 to its rearward side. The rearward side of body 98 has a threaded portion 114 formed therein to receive one of delivery pipes 40, 42.

An air inlet channel also exists that allows air to enter constricted channel 110. Forced fluid or gas is alternatively used to force the feed additive through receiver couplings 36, 38 and into fluid pipe 44. Output channel 112 is connected to fluid pipe 44 through one of delivery pipes 40, 42, with a venturi connection such that negative pressure is achieved. Air inlet channel 116 extends through air inlet tube 106 and through body 98 to intersect constricted channel 110. Because of the vacuum pressure created by a venturi connection at fluid pipe 44, air is pulled through air inlet channel 116 to clean any microingredient from constricted channel 110 and output channel 112, as well as whichever of the delivery pipes 40, 42 is connected thereto. This provides positive delivery of measured amounts of microingredients from cartridges 22, since it assures that any microingredient dispensed from the cartridges 22 is immediately pulled into the venturi connection with fluid pipe 44.

Air inlet tube 106 is connected to and held in place within body 98 by having an enlarged diameter at its lower end that fits within body 98 and that is larger than the width of cutaway 104 on nose guide 100. Therefore, once nose guide 100 is fitted in place over body 98, air inlet tube 106 is held securely in place.

The special configuration of nose guide 100 combined with O-ring 108 and body 98 does not allow nose 28 of cartridge 22 to be inserted too far within receiver couplings 36, 38. The inside diameter of constricted channel 110 is approximately equal to the inside diameter of nose 28 of cartridge 22. Nose guide 100 guides nose 28 to nose opening 102 and into O-ring 108 when force is first applied to the plunger. Cartridge 22 cannot advance further since the outside diameter of nose 28 is held back by body 98. This special construction prevents a spent cartridge from becoming hung up within O-ring 108 or nose guide 102 when released. When allowed to fall within catch bin 46, nose 28 of cartridge 22 simply slides out of O-ring 108 and down the lower side of nose guide 100. Receiver couplings 36, 38 do not have to be moved in a forward direction nor does cartridge 22 need to be moved in a rearward direction for cartridge 22 to be released.

The above-described invention inherently provides several advantages over the previous methods and devices to administer microingredients to animal feed. One advantage is the ability of the method and system to avoid contamination and maintain viability of the microingredient. Since the microingredient is contained within cartridges 22 until it is delivered to the animal feed little chance for contamination exists. Also, little chance for physical or chemical breakdown of the microingredient exists since it is protected from environmental conditions by being contained within cartridge 22. The time during which the microingredient is outside of the controlled environment of cartridge 22 before being mixed with animal feed is minimal. This is in contrast to prior methods where the microingredients are pooled in vats and other containers outside of their original packaging for a significant amount of time before being transported to the animal feed.

Each module 10 is easily cleanable as well. The only parts of module 10 with which the microingredient comes into contact are receiver couplings 36, 38 and delivery pipes 40,42. These parts are, to a large extent, cleaned automatically due to the venturi connections to fluid pipe 44. At other locations within module 10 the microingredient is always contained within sterile cartridges 22. Cleaning cartridges are alternatively used to facilitate cleaning of the delivery system components.

To add to the overall ease of cleaning and service, plunger drive mechanism 58 is almost completely contained within gear housing 86. The only elements protruding out of gear housing 86 are the ends of racks 64, 66. Besides, other than plunger drive mechanism 58, the only moving parts are solenoids 48, 56 and paddlewheels 50, 52, all of which are simple and easy to maintain.

The system of the present invention also provides more accurate delivery and accounting of microingredients. Cartridges 22 contain set, predetermined amounts of microingredients. The dispensing of each cartridge 22 is also slow and highly controlled. Once the contents of cartridge 22 have been dispensed there is no question about accuracy of what has been administered. Besides, with the bar coding system and switches indicating the progression of a cartridge throughout the system, all accounting of additive administration can be automatically done with a computer connected to the system to receive the data as the microingredients are delivered. With this set up, high quality control is assured and no inaccurate records are produced since the data is automatically logged in.

Another advantage is the ease of use of the microingredient dispenser of the present invention. Once hoppers 32, 34 are loaded everything else is fully automated and self-recording. With the switches in place, it also can signal an operator when a problem does occur. Even hard-to-detect problems, such as a wrong or time-expired microingredient cartridge loaded into one of hoppers 32, 34, can be caught. Intentional changing to a different ingredient within hoppers 32, 34 also presents no problems and minimal effort since the system is somewhat self-cleaning and can be computer controlled to accept the different ingredient.

The cartridge delivery system of the present invention also allows each module 10 to be quite compact compared to the prior-art devices. This compactness allows more flexibility and lower overall costs to the user.

The system is also easily expandable on an additive-by-additive basis. One need only install another module 10 and connect it to fluid pipe 44. This way the individual needs of the user are easily met and the user has more flexibility in administering additives and dosages.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An apparatus for delivering a continual supply of ingredients from cartridges each having a plunger, a forward end, and a rearward end, the apparatus comprising at least one module to dispense a specific microingredient, wherein the module comprises:

(a) a frame having a forward side and a rearward side;

(b) a first hopper attached to the frame for holding at least one cartridge;

(c) a first dispensing station disposed adjacent the first hopper for receiving the cartridges from the first hopper and for holding a cartridge during delivery of an ingredient from the cartridge; and (d) a plunger drive mechanism attached to the frame at the rearward side for advancing the plunger within the first cartridge to thereby dispense an ingredient.

2. The apparatus of claim 1, wherein the module further comprises:

(a) a second hopper attached to the frame for holding at least one cartridge; and (b) a second dispensing station disposed adjacent the second hopper for receiving cartridges from the second hopper and for holding a cartridge during delivery of an ingredient from the cartridge, wherein the plunger drive mechanism is attached to the frame adjacent the first and second dispensing stations and includes means for moving the plunger of the first cartridge and the plunger of the second cartridge such that the first cartridge in the first dispensing station delivers an ingredient while the second cartridge is being readied for dispensing an ingredient from the second dispensing station.

3. The apparatus of claim 2, wherein the plunger drive mechanism comprises:

(a) a first rod positioned to the rear of the first cartridge in the first dispensing station and slidably coupled to the frame and disposed along a longitudinal axis of the first cartridge;

(b) a second rod positioned to the rear of the second cartridge in the second dispensing station and slidably coupled to the frame and disposed along a longitudinal axis of the second cartridge; and (c) rod drive means for moving the first rod and the second rod longitudinally along said longitudinal axes of the first and second cartridges.

4. The apparatus of claim 3, wherein the rod drive means causes the first rod and the second rod to move in opposite directions.

5. The apparatus of claim 3, further comprising means for indicating contact of the first rod with the plunger of the first cartridge at the first dispensing station and indicating contact of the second rod with the plunger of the second cartridge at the second dispensing station.

6. The apparatus of claim 2, further comprising a first cartridge retainer mechanism attached to the frame to controllably advance cartridges from the first hopper into and out of the first dispensing station, and a second cartridge retainer mechanism attached to the frame to controllably advance cartridges from the second hopper into and out of the second dispensing station.

7. The apparatus of claim 6, wherein the first cartridge retainer mechanism comprises a first paddlewheel, and the second cartridge retainer mechanism comprises a second paddlewheel.

8. The apparatus of claim 2, further comprising a control means for:
(a) controllably advancing the first rod and the second rod;
(b) controllably advancing the first cartridge through the first hopper to the first dispensing station and controllably advancing the second cartridge through the second hopper to the second dispensing station; and
(c) controllably ejecting the first and second cartridge from the respective dispensing stations.

9. The apparatus of claim 1, wherein the module further comprises an ingredient receiver coupling attached to the frame for receiving the forward end of the first cartridge and forming a seal therewith.

10. The apparatus of claim 9, wherein the first cartridge and the second cartridge each have a nose portion with an inside surface through which an ingredient is delivered, and an outside surface, wherein the ingredient receiver coupling comprises:
(a) a nose guide portion disposed at the rearward end of the ingredient receiver coupling, said nose guide portion having an inward slope to direct the nose portion as it moves into engagement with the ingredient receiver coupling;
(b) a flexible seal disposed adjacent to the nose guide portion to seal the connection between the nose portion and the ingredient receiver coupling; and
(c) an ingredient channel extending through the ingredient receiver coupling to direct the flow of an ingredient as it is received from the cartridge.

11. The apparatus of claim 10, wherein the ingredient receiver coupling further comprises an inlet channel extending from outside the ingredient receiver coupling to a rearward portion of the ingredient channel.

12. The apparatus of claim 1, further comprising a bar code reader coupled to the frame, wherein the cartridges include bar codes, the bar code reader being arranged and configured to read the bar codes of cartridges dispensed from the first dispensing station.

13. An apparatus for receiving a fluid from a cartridge having a nose with a longitudinal axis, inner walls forming a cartridge channel, and outer walls, the apparatus comprising:
(a) a nose guide portion having sides forming an opening, the sides having an inward slope to direct the nose into the opening as the nose moves into engagement for delivery of the fluid;
(b) a body portion coupled to the nose guide portion, the body portion having an outer surface, inner walls forming a channel, and a body coupling that is connectable to fluid transport piping, the channel extending from the nose guide portion opening to the body coupling; and
(c) a flexible seal coupled to the body portion adjacent the nose guide portion and having inner surfaces configured to seal an interface between the body portion and the nose of the cartridge.

14. The apparatus of claim 13, further comprising an air inlet channel extending at least from the outer surface of the body portion through the inner walls near the interface between the body portion and the nose of the cartridge.

15. The apparatus of claim 13, wherein the flexible seal comprises an O-ring seal, the nose guide portion and the body portion being separable so as to allow insertion of the O-ring seal.

16. A method of dispensing a microingredient into animal feed comprising the steps of:
(a) providing a plurality of cartridges having longitudinal axes, outer portions, plungers, and microingredients disposed within, the cartridges being held within at least one hopper;
(b) moving a first cartridge from the hopper to a first dispensing station;
(c) applying a forward force to a plunger of the first cartridge;
(d) allowing the first cartridge to slide into engagement with a first microingredient receiver coupling in response to the forward force on the plunger; and
(e) moving the plunger relative to the outer portion of the first cartridge with continued forward force on the plunger while the first cartridge is held from further forward movement by the first microingredient receiver coupling, movement of the plunger causing the microingredient within the first cartridge to exit the first cartridge and travel into the first microingredient receiver coupling.

17. The method of claim 16, further comprising the steps of:
(a) positioning a second cartridge at a second dispensing station while the first cartridge is in position at the first dispensing station;
(b) removing the forward force from the plunger of the first cartridge and applying a forward force to a plunger of the second cartridge;
(c) allowing the second cartridge to slide into engagement with a second microingredient receiver coupling in response to the forward force on the plunger of the second cartridge; and
(d) moving the plunger of the second cartridge relative to the outer portion of the second cartridge with continued forward force on the plunger of the second cartridge while the second cartridge is held from further forward movement by the second microingredient receiver coupling, movement of the plunger causing the microingredient within the second cartridge to exit the second cartridge and travel into the second microingredient receiver coupling.

18. The method of claim 17, further comprising the steps of:
(a) ejecting the first cartridge while the second cartridge is in position at the second dispensing station; and
(b) positioning a third cartridge at the first dispensing station.

19. The method of claim 17, wherein the step of applying a forward force to the plunger of the first cartridge comprises forcing a first rod against the plunger of the first cartridge in a forward direction along the longitudinal axis of the first cartridge, wherein the step of removing the forward force from the plunger of the first cartridge comprises moving the first rod in a rearward direction.

20. The method of claim 19, wherein the step of applying a forward force to the plunger of the second cartridge comprises forcing a second rod against the plunger of the second cartridge in a forward direction along the longitudinal axis of the second cartridge, wherein the first rod and the second rod move in opposite directions, the second rod forcing the delivery of a microingredient from the second cartridge at the second dispensing station while the first rod is being retracted from the first cartridge at the first dispensing station.

21. An apparatus for delivering a continual supply of ingredients from cartridges each having a plunger, a forward end, and a rearward end, the forward end having a nose portion with an inside surface, through which an ingredient is delivered, and an outside surface, the apparatus comprising:

(a) a frame having a forward side and a rearward side;

(b) a first hopper attached to the frame for holding at least one cartridge;

(c) a first dispensing station disposed adjacent the first hopper for holding a first cartridge during delivery of the ingredient from said first cartridge;

(d) a second hopper attached to the frame for holding at least one cartridge;

(e) a second dispensing station disposed adjacent the second hopper for holding a second cartridge during delivery of the ingredient from said second cartridge;

(f) a plunger drive mechanism attached to the frame at the rearward side for advancing the plunger in the first cartridge and the plunger in the second cartridge to thereby dispense an ingredient, wherein the plunger drive mechanism drives the plunger of the first cartridge such that the first cartridge delivers an ingredient while the second dispensing station is being readied for the loading of a fresh second cartridge, the plunger drive mechanism comprising:

(i) a first rod positioned to the rear of the first cartridge in the first dispensing station and slidably coupled to the frame and disposed along a longitudinal axis of the first cartridge;

(ii) a second rod positioned to the rear of the second cartridge in the second dispensing station and slidably coupled to the frame and disposed along a longitudinal axis of the second cartridge; and (iii) rod drive means for moving the first rod and the second rod longitudinally along said longitudinal axes of the first and second cartridges;

(g) first and second ingredient receiver couplings attached to the frame for receiving the forward ends of respective first and second cartridges at the first and second dispensing stations, and forming a seal therewith, wherein each ingredient receiver coupling comprises:

(i) a nose guide portion disposed at the rearward end of the ingredient receiver coupling, said nose guide portion having an inward slope to direct the nose portion as it moves into engagement with the ingredient receiver coupling;

(ii) a flexible seal disposed adjacent to the nose guide portion to seal the connection between the nose portion and the ingredient receiver coupling; and (iii) an ingredient channel extending through the ingredient receiver coupling to direct the flow of an ingredient as it is received from a cartridge;

(h) a first cartridge retainer mechanism attached to the frame to controllably advance cartridges from the first hopper into and out of the first dispensing station, and a second cartridge retainer mechanism attached to the frame to controllably advance cartridges from the second hopper into and out of the second dispensing station; and (i) control means for:

(i) controllably advancing the first rod and the second rod;

(ii) controllably advancing the first cartridge through the first hopper to the first dispensing station and controllably advancing the second cartridge through the second hopper to the second dispensing station; and (iii) controllably ejecting the first and second cartridges from the respective dispensing stations.

22. An apparatus for delivering a continual supply of ingredients from cartridges, each having a plunger, a forward end, and a rearward end, the apparatus comprising at least one module to dispense a specific microingredient, wherein the module comprises:

(a) a frame having a forward side and a rearward side;

(b) a first hopper attached to the frame for holding at least one cartridge;

(c) a first dispensing station disposed adjacent the first hopper for receiving the cartridges from the first hopper and for holding the cartridges during delivery of an ingredient from the cartridges;

(d) a plunger drive mechanism attached to the frame at the rearward side for advancing the plunger within the first cartridge to thereby dispense an ingredient; and (e) a first cartridge retainer mechanism attached to the frame to controllably advance cartridges from the first hopper into and out of the first dispensing station.

23. The apparatus of claim 22, wherein the first cartridge retainer mechanism comprises a first paddlewheel.

24. The apparatus of claim 22, further comprising:

a second hopper attached to the frame for holding at least one cartridge;

a second dispensing station disposed adjacent the second hopper for receiving cartridges from the second hopper and for holding a cartridge during delivery of an ingredient from the cartridge, wherein the plunger drive mechanism is attached to the frame adjacent the first and second dispensing stations and includes means for moving the plunger of the first cartridge and the plunger of the second cartridge such that the first cartridge in the first dispensing station delivers an ingredient while the second cartridge is being readied for dispensing an ingredient from the second dispensing station; and a second cartridge retainer mechanism attached to the frame to controllably advance cartridges from the second hopper into and out of the second dispensing station.

* * * * *

UNITED STATES PATENT AND TRADEMARK OFFICE
CERTIFICATE OF CORRECTION

PATENT NO. : 5,358,145
DATED : October 25, 1994
INVENTOR(S) : S.H. Smith et al.

It is certified that error appears in the above-indentified patent and that said Letters Patent is hereby corrected as shown below:

| COLUMN | LINE | |
|---|---|---|
| Title page, before item 57 Abstract | Attorney, Agent, or Firm | "O'Conner," should read --O'Connor,-- |
| 1 | 6 | "carder," should read --carrier,-- |
| 4 | 33 | "FIG. 3 A;" should read --FIG. 3A;-- |
| 6 | 37 | "carder" should read --carrier-- |

Signed and Sealed this

Fourteenth Day of November, 1995

Attest:

BRUCE LEHMAN

*Attesting Officer*     *Commissioner of Patents and Trademarks*